(12) United States Patent
Barcelo et al.

(10) Patent No.: US 11,280,740 B2
(45) Date of Patent: Mar. 22, 2022

(54) LUMINESCENCE-ENHANCEMENT SYSTEMS

(71) Applicant: Hewlett-Packard Development Company, L.P., Spring, TX (US)

(72) Inventors: Steven Barcelo, Palo Alto, CA (US); Anita Rogacs, San Diego, CA (US); Raghuvir N. Sengupta, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/968,330

(22) PCT Filed: Apr. 6, 2018

(86) PCT No.: PCT/US2018/026391
§ 371 (c)(1),
(2) Date: Aug. 7, 2020

(87) PCT Pub. No.: WO2019/194814
PCT Pub. Date: Oct. 10, 2019

(65) Prior Publication Data
US 2021/0096079 A1    Apr. 1, 2021

(51) Int. Cl.
*G01N 21/65* (2006.01)
*G01J 3/44* (2006.01)
(Continued)

(52) U.S. Cl.
CPC .............. *G01N 21/658* (2013.01); *G01J 3/44* (2013.01); *G01N 21/554* (2013.01); *G01N 21/648* (2013.01); *B82Y 15/00* (2013.01)

(58) Field of Classification Search
CPC .. G01N 21/658; G01N 21/648; G01N 21/554; G01J 3/44; B82Y 15/00
See application file for complete search history.

(56) References Cited

U.S. PATENT DOCUMENTS 6,225,061 B1 * 5/2001 Becker .................... B01J 19/16
506/16
9,157,842 B1   10/2015 Ancona et al.
(Continued)

FOREIGN PATENT DOCUMENTS

CN    106814059    6/2017
CN    107037032    8/2017
(Continued)

*Primary Examiner* — Dominic J Bologna
(74) *Attorney, Agent, or Firm* — Thorpe North & Western LLP (57) ABSTRACT

A luminescence-enhancement system can include a luminescence-enhancement sensor having a substrate and a group of nanofingers with individual nanofingers that can be flexible and include a support end attached to the substrate, a distal tip positioned distally with respect to the substrate, and a middle portion between the support end and the distal tip. A coating of a metal or metal alloy can be applied to the substrate and the distal tip that is conductively continuous. The middle portion can be devoid of the coating or the coating at the middle portion is conductively discontinuous. A liquid ejector can be present and can include a jetting nozzle to eject a liquid droplet having a volume of 2 pL to 10 μL. The group of nanofingers and the jetting nozzle can be positionable relative to one another for the droplet to be deposited on the group of nanofingers.

17 Claims, 7 Drawing Sheets

(51) Int. Cl.
*G01N 21/64* (2006.01)
*G01N 21/552* (2014.01)
*B82Y 15/00* (2011.01)

(56) References Cited

U.S. PATENT DOCUMENTS

| | | |
|---|---|---|
| 2004/0241667 A1 | 12/2004 | Chesk et al. |
| 2014/0009758 A1* | 1/2014 | Li .................... B05D 3/007 |
| | | 356/301 |
| 2014/0024131 A1 | 1/2014 | Kim et al. |
| 2014/0209837 A1 | 7/2014 | Barcelo et al. |
| 2016/0069810 A1 | 3/2016 | Walavalkar et al. |
| 2016/0116334 A1 | 4/2016 | Yang et al. |
| 2016/0146737 A1 | 5/2016 | Kim et al. |
| 2016/0363539 A1* | 12/2016 | Barcelo ............. B82Y 15/00 |

FOREIGN PATENT DOCUMENTS

| | | |
|---|---|---|
| CN | 107643278 | 1/2018 |
| JP | 2015-212674 A | 11/2015 |
| JP | 2016-505157 A | 2/2016 |
| WO | WO-2018017021 | 1/2018 |

\* cited by examiner

900 ejecting a droplet of a liquid with an analyte from a jetting nozzle onto a luminescence-enhancement sensor including a group of nanofingers attached to a substrate, wherein individual nanofingers are flexible and include a support end attached to the substrate, a distal tip positioned distally with respect to the substrate, and a middle portion between the support end and the distal tip, the luminescence-enhancement sensor including a coating of a metal or metal alloy applied to the substrate and the distal tip that is conductively continuous, and wherein the middle portion is devoid of the coating or the coating at the middle portion is conductively discontinuous — 910 converging individual nanofingers of the group of nanofingers to form an enhanced luminescence region where respective distal tips of the individual nanofingers are converged while leaving a gap between the respective distal tips — 920 optically detecting a signal emitted from analyte positioned at the enhanced luminescence region — 930

FIG. 9

LUMINESCENCE-ENHANCEMENT SYSTEMS

BACKGROUND

Luminescence detection systems can measure localized surface plasmon resonance, photon scattering, and the like. For example, resonance can occur when electrons on the surface of a substrate, which in some contexts can be referred to as a sensor, oscillate in response to specific wavelengths of light. Luminescence detection systems generally can be utilized for determining the chemical identity and/or structural information of a molecule in the fields of polymer and material sciences, biochemistry, bio-sensing, catalysis, electrochemistry, etc. More specifically, these types of systems can be used in the detection of molecules in biological samples, diseases, and explosives, as well as for determining the physical arrangement of atoms in a molecule.

BRIEF DESCRIPTION OF DRAWINGS

It is understood that the figures herein are representative of examples presented herein and should not be considered as particularly limiting. Furthermore, the FIGS. are not necessarily to scale, but rather represent examples.

DETAILED DESCRIPTION

Luminescence sensors for analyte detection and/or molecular arrangement detection can be prepared by soaking the sensor in a solution containing target compound to adsorb the solution onto the sensor surface, and in many instances, rinsing the sensor to remove loosely bound molecules and/or to prevent a concentration gradient from forming on the sensor, often followed by drying the sensor. This process can be time consuming, and in some instances, additional rinsing and drying steps can be added to improve sensor characteristics, e.g., to control nanofinger closing or for other methodology. For example, to enhance sensitivity of a sensor, such as for use with liquids containing a low concentration of a target compound or analyte, e.g., sometimes even single molecule detection, a more precisely controlled, predictable, and/or uniform nanofinger closure methodology may be useful in practice. Accordingly, luminescence-enhancement systems described herein can allow for less tedious and time-consuming preparation of a luminescence-enhancement sensor, and such luminescence-enhancement sensors can exhibit good sensitivity when used with the systems described herein.

In accordance with this, a luminescence-enhancement system can include a luminescence-enhancement sensor including a substrate, a group of nanofingers, and a coating of a metal or metal alloy applied thereto. The group of nanofingers can include individual nanofingers (within the group) that can be flexible and include a support end attached to the substrate, a distal tip positioned distally with respect to the substrate, and a middle portion between the support end and the distal tip. The coating, more specifically, can be applied to the substrate and the distal tip in a manner that is conductively continuous, e.g., a continuation coating or effectively continuous coating with respect to electrical conductivity. On the other hand, the middle portion (of the nanofingers) can be devoid of the coating or the coating at the middle portion can be conductively discontinuous, e.g., the middle portion is not conductive. The system can also include a liquid ejector including a jetting nozzle to eject a liquid therefrom in the form of a droplet having a volume of 2 pL to 10 µL. The group of nanofingers and the jetting nozzle can be positionable relative to one another for the droplet to be deposited on the group of nanofingers. In one example, individual nanofingers within the group of nanofingers are spaced at the support end at from 20 nm to 500 nm, have an average length from 0.05 µm to 2 µm, and an average cross-sectional width at the support end from 50 nm to 500 nm. In another example, the liquid ejector can further include the liquid loaded therein. The liquid and the flexible nanofingers can thus be paired so that the droplet ejected by the liquid ejector onto the group of nanofingers generates forces to cause adjacent individual nanofingers of the group of nanofingers converge at their respective distal tips but still leave a gap between adjacent distal tips. In a specific example, the liquid can have a surface tension and can be ejectable from the liquid ejector at a droplet volume relative to spacing between individual nanofingers of the group of nanofingers such that individual nanofingers of the group of nanofingers are contacted by the droplet at their respective distal tips without wetting the support end of the nanofinger. In another example, the droplet can wet both the distal tip and the substrate. The liquid ejector can be tunable to time ejection of the droplets onto the group of nanofingers relative to an evaporation rate of liquid from the droplet of liquid. In one example, the luminescence-enhancement system can include a second liquid ejector including a second jetting nozzle to eject a second liquid therefrom in the form of a second droplet having a volume of 2 pL to 10 µL. In this example, the liquid ejector can include the liquid loaded therein, and the second liquid ejector can include the second liquid loaded therein. The liquid can include an analyte to be loaded on the group of nanofingers via the droplet, and the second liquid can cause adjacent individual nanofingers of the group of nanofingers to converge at their respective distal tips upon contact or evaporation of the droplet but still leave a gap between adjacent distal tips. In another example, the luminescence-enhancement system can include a movable stage supporting the luminescence-enhancement sensor to align the group of nanofingers with the jetting nozzle, an optical detector (that may be present for detecting scattering, resonance, etc.), or a combination thereof. The system can also include a plurality of periodically spaced groups of nanofingers with adjacent groups of nanofingers spaced at from 0.5 μm to 5 μm. For example, there can be multiple groups of nanofingers that can be used for detection independent of one another, or groups can be in small groupings, e.g., 2 groups, 3 groups, 10 groups, 50 groups, etc., or all of the groups can be evaluated as a field of groups.

In another example, a luminescence-enhancement system can include a luminescence-enhancement sensor, a liquid ejector, a radiation source, and an optical detector. The luminescence-enhancement sensor can include a substrate, a group of nanofingers, and a coating of a metal or metal alloy applied thereto. The group of nanofingers can include individual nanofingers (within the group) that can be flexible and include a support end attached to the substrate, a distal tip positioned distally with respect to the substrate, and a middle portion between the support end and the distal tip. The coating, more specifically, can be applied to the substrate and the distal tip in a manner that is conductively continuous, e.g., a continuation coating or effectively continuous coating with respect to electrical conductivity. On the other hand, the middle portion (of the nanofingers) can be devoid of the coating or the coating at the middle portion can be conductively discontinuous, e.g., the middle portion is not conductive. The system can also include a liquid ejector including a jetting nozzle to eject a liquid therefrom in the form of a droplet having a volume of 2 pL to 10 μL. The group of nanofingers and the jetting nozzle can be positionable relative to one another for the droplet to be deposited on the group of nanofingers. For example, the jetting nozzle can move along a carriage linearly, or in planar 2D space, or in 3D space to position itself relative to a target group of nanofingers. The luminescence-enhancement sensor can be on a platform that is movable laterally, in planar 2D space, or in 3D space to position itself relative to the jetting nozzle. In another example, both the jetting nozzle and the sensor can be movable to become aligned for fluid droplet deposition from the nozzle onto a group of nanofingers or even a single nanofinger. The electromagnetic radiation source can emit electromagnetic radiation toward the group of nanofingers, and the optical detector can detect luminescence emitted from an enhanced luminescence region generated by application of the droplet on the group of nanofingers. The luminescence emitted (from the enhanced luminescence region) can be in response to interaction with the electromagnetic radiation. Again, there can be more than one group of nanofingers. In one example, the luminescence-enhancement system is a surface-enhanced Raman spectroscopy (SERS) system or a surface-enhanced fluorescence (SEF) system.

In another example, method of sensing an analyte can include ejecting a droplet of a liquid with an analyte from a jetting nozzle onto a luminescence-enhancement sensor including a group of nanofingers attached to a substrate. Individual nanofingers can be flexible and include a support end attached to the substrate, a distal tip positioned distally with respect to the substrate, and a middle portion between the support end and the distal tip. The luminescence-enhancement sensor can include a coating of a metal or metal alloy applied to the substrate and the distal tip that is conductively continuous, and the middle portion can be devoid of the coating or the coating at the middle portion is conductively discontinuous. Additional steps can include converging individual nanofingers of the group of nanofingers to form an enhanced luminescence region (or "hot spot"), where respective distal tips of the individual nanofingers can be converged while still leaving a small gap therebetween; and optically detecting a signal emitted from analyte positioned at the enhanced luminescence region. This can provide information for detecting the analyte, for example. In one example, converging can include ejecting a second droplet of a second liquid from a second jetting nozzle onto the group of nanofingers. In another example, converging can occur due to capillary forces that can be caused by droplet evaporation from contact with the group of nanofingers and analyte can be deposited from the liquid at the enhanced luminescence region.

It is noted that when discussing the various systems and methods, each of these discussions can be considered applicable to other examples whether or not they are explicitly discussed in the context of that example. Thus, for example, in discussing a luminescence-enhancement sensor related to a luminescence-enhancement system, such discussion is also relevant to and directly supported in the context of other types of systems and in a method of sensing an analyte using a luminescence-enhancement sensor and vice versa.

As mentioned, the present examples relate to luminescence-enhancement systems and methods of sensing an analyte. The luminescence-enhancement systems and methods herein can be utilized for measuring surface-enhanced luminescence. As used herein, when referring to luminescence that is "surface-enhanced," examples can include surface-enhanced Raman emission, surface-enhanced fluorescence, rayliegh emissions, etc. For example, surface-enhanced Raman spectroscopy (SERS) and surface-enhanced fluorescence includes the use of a metal or metalized surface that is rough, and in accordance with the present disclosure, the rough surface includes a metalized substrate with flexible nanofingers having metalized tips. These specific structures can be referred to herein as a luminescence-enhancement "sensor."

Figure 1A:
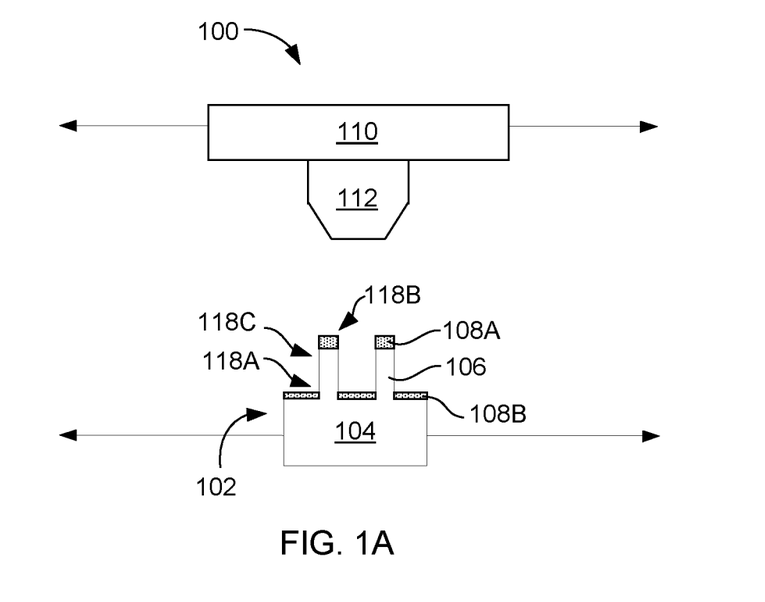
FIG. 1A schematically depicts an example of a luminescence-enhancement system in accordance with examples herein.
Figure 1B:
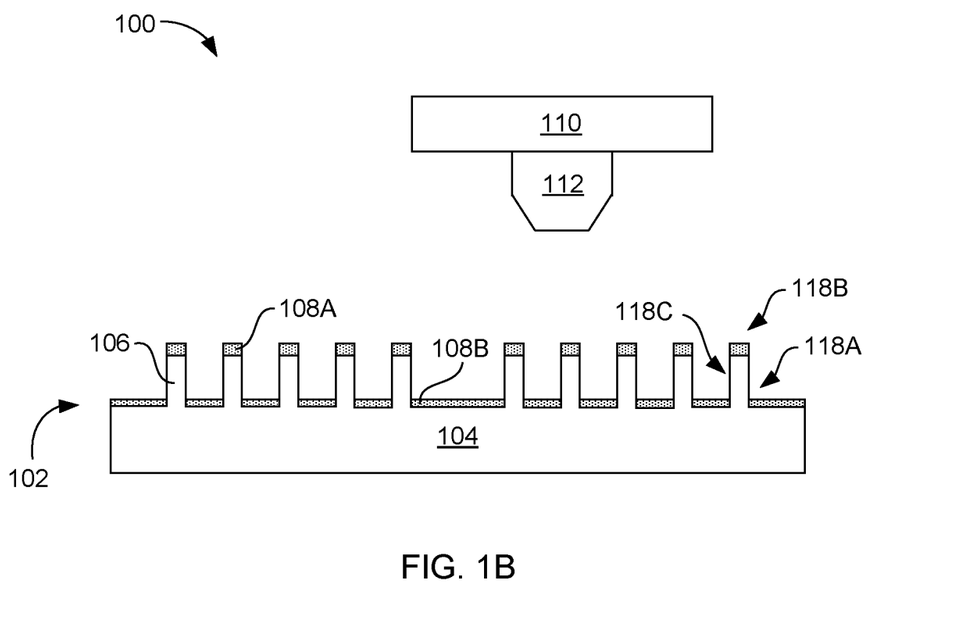
FIG. 1B schematically depicts an example of a luminescence-enhancement system in accordance with examples herein.

Turning to the system per se, as shown in FIGS. 1A and 1B, the system 100 can include a luminescence-enhancement sensor 102 and a liquid ejector 110. The luminescence-enhancement sensor can include a substrate 104 and flexible nanofingers 106 arranged in a group (or multiple groups as shown in FIG. 1B). The individual nanofingers can include a support end 118A attached to the substrate, a distal tip 118B, and a middle portion 118C therebetween. A conductive metal or metal alloy can coat the substrate 108B and a distal tip 108A of the nanofingers, and the middle portion can remain uncoated or can be discontinuously coated so that the coating is not conductive along that portion of the nanofingers (e.g., discontinuous enough to be effectively functionally nonconductive relative to the substrate and the distal tip coatings). The liquid ejector 110 can include a jetting nozzle 112 for ejecting a liquid as droplets onto the luminescence-enhancement sensor, individual groups of nanofingers, a plurality or grouping of nanofingers groups, or to tips of nanofingers without wetting the substrate, etc.

The luminescence-enhancement sensor can include a substrate. The substrate can be a flat planar surface ranging from 10 μm² to 25 mm² in size, in one example, but can also be non-uniform or of a configuration other than planar. In some examples, the substrate can be in the form of a sheet, wafer, film, or a web. The substrate can be rigid or flexible and can be composed of a material selected from silicon, glass, quartz, silicon nitride, sapphire, aluminum oxide, diamond, diamond-like carbon, polymers, metals, metallic alloys, or a combination thereof. In one example, the substrate can be composed of a polymer such as a polyamide, polyethylene, polypropylene, or a combination thereof. The substrate can be rigid or flexible.

The luminescence-enhancement sensor can further include flexible-nanofingers extending perpendicular from the substrate. The nanofingers can be a columnar structure that can include a support end attached to the substrate and a distal tip. The shape of individual nanofingers can vary. For example, the individual nanofingers can be in the shape of columns, cones, pyramids, rods, bars, or the like. In one example, individual nanofingers can have a length from the substrate end to the distal tip ranging from 0.05 µm to 2 µm. In yet other examples the length can range from 0.05 µm to 0.9 µm, from 0.25 µm to 2 µm, from 0.50 µm to 1 µm, or from 0.75 µm to 1.5 µm. In some examples, the nanofingers can taper in cross-sectional width with a circumference at the support end wider than a circumference at the distal tip. In yet other examples, a cross-sectional width of individual nanofingers can be substantially consistent along the length of the nanofinger. In some examples, the cross-sectional width can range from 50 nm to 500 nm. In yet other examples, the cross-sectional width can range from 100 nm to 500 nm, from 100 nm to 300 nm, from 50 nm to 250 nm, or from 75 nm to 450 nm. In some examples, the cross-sectional width can be an average along the length of a nanofinger; while in other examples, the cross-sectional width can be the width at the distal tip of a nanofinger.

The spacing between individual nanofingers can also vary. In one example, the spacing between individual nanofingers at the support end can vary from 20 nm to 500 nm. In yet other examples, the spacing between individual nanofingers at the support end can vary from 50 nm to 400 nm, from 100 nm to 300 nm, from 75 nm to 350 nm, from 200 nm to 500 nm, or from 150 nm to 400 nm.

Figure 2A:
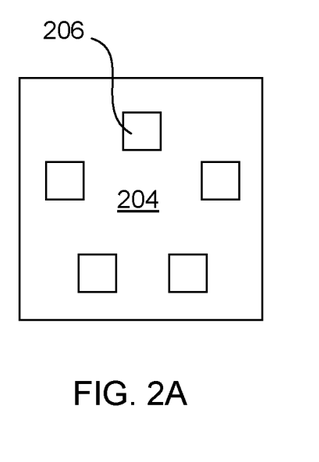
FIG. 2A schematically depicts a top view of a substrate with flexible nanofingers arranged in a group in accordance with examples herein.
Figure 2B:
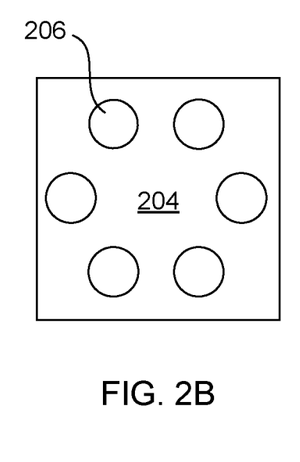
FIG. 2B schematically depicts a top view of a substrate with flexible nanofingers arranged in a group in accordance with examples herein.
Figure 2C:
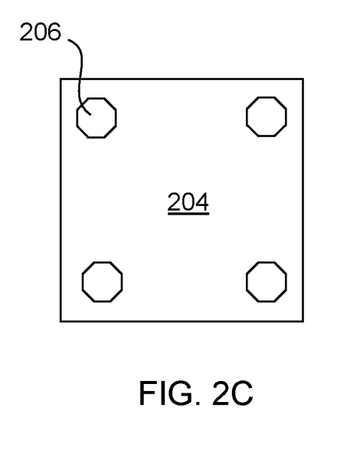
FIG. 2C schematically depicts a top view of a substrate with flexible nanofingers arranged in a group in accordance with examples herein.

As mentioned, the nanofingers can be arranged in a group on the substrate. In one example, the group can be an array, such as several aligned rows of individual nanofingers. In other examples, the group can be a geometric grouping where the nanofingers can be arranged peripherally to a center point. For example, the nanofingers can be arranged in the shape of a triangle, a square, a pentagon, a hexagon, a heptagon, an octagon, a nonagon, a decagon, etc. A top view of different geometric configurations for a group is shown in FIGS. 2A-2C, including a top partial view of a substrate 204 and a top view of nanofingers 206. In one specific example, the pentagon group can be a good arrangement to use in accordance with the present disclosure.

The spacing between individual nanofingers within a group can also vary. For example, individual nanofingers within a group can be spaced apart at the support end from one another at from 50 nm to 400 nm. In other examples, individual nanofingers within a group can be spaced apart at the support end from one another at from 100 nm to 350 nm, from 50 nm to 250 nm, or from 75 nm to 300 nm. In one example, individual nanofingers within a group can be spaced at the support end at from 50 nm to 400 nm, and the nanofingers can have an average length from 0.25 µm to 2 µm and an average cross-sectional width at the support end from 50 nm to 500 nm. In some examples, spacing, length, and width of nanofingers can be relational to one another in order to achieve a specified gap between distal tips upon convergence.

Figure 3:
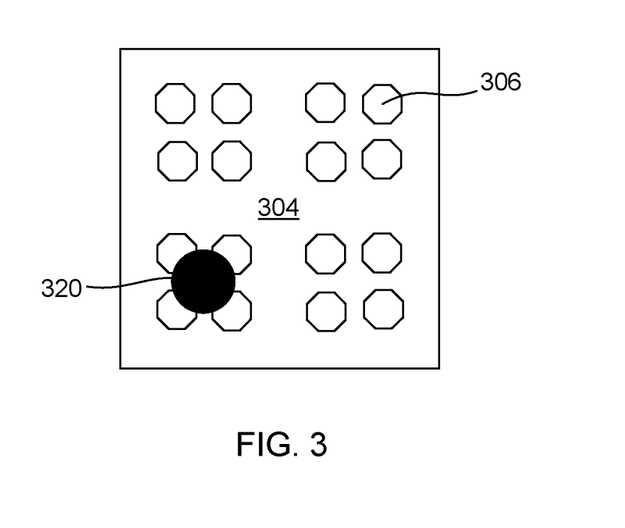
FIG. 3 schematically depicts a top view of a substrate with multiple groups of flexible nanofingers arranged in groups in accordance with examples herein.

In other examples, the substrate can include multiple groups of nanofingers, or "groupings" of groups of nanofingers. A schematic example of a top view of a (partial) substrate 304 and the top of individual nanofingers 306 arranged in a group, along with adjacent groups is shown in FIG. 3. Also shown in FIG. 3 is a droplet 320 of a liquid suspended across the distal tip of nanofingers within one of the groups of nanofingers shown. In one example, the surface tension of the droplet and a hydrophobicity of the distal tips can permit the droplet to remain suspended on the distal tips of nanofingers within a group until evaporation occurs. For example, the substrate can include a plurality of periodically spaced groups of nanofingers. In one example, the spacing between adjacent groups can be from 0.5 µm to 5 µm. In other examples, the spacing between adjacent groups of nanofingers can range from 1 µm to 5 µm, from 0.5 µm to 4 µm, or from 0.75 µm to 3 µm.

The nanofingers can be composed of the same material as the substrate or a different material. In one example, the nanofingers can include a dielectric material, a non-dielectric material, a semi-conductive material, etc. In one example, conductivity of the middle portion of the nanofingers can be less than the conductivity of the metal or metal alloy coated on the substrate and the distal tips of the nanofingers. The nanofingers can be composed of a polysiloxane, silicon, silicon dioxide, silicon nitride, spin-on glass, sol-gel, diamond, carbon, aluminum oxide, sapphire, zinc oxide, titanium dioxide, copolymers, or combinations thereof. A flexible composition can allow a distal tip of an individual nanofinger to converge towards a distal tip of another nanofinger or to a center point when the nanofingers are arranged in a group of nanofingers.

The substrate and the distal tip of the nanofingers can be coated with a conductive metal or metal alloy. As used herein, "metal alloy" is intended to include a combination of multiple metals, or even a combination of a metal(s) and non-metal. A metal alloy can also include the co-application of two metals on the substrate and the distal tip of nanofingers, or can include a blended metal of the multiple metals (or metal and non-metal). In one example, the metal or metal alloy can include copper, silver, aluminum, or gold. The coating can enhance luminescence from an analyte that can be in close proximity thereto, such as when applied using the liquid ejector described herein.

In some examples, the nanofingers of the group when contacted by the droplet can converge but leave a gap between nanofingers at their distal tip. In one example, this can be due to contact or evaporation of liquid from the droplet. For example, a liquid can pool or remain trapped between nanofingers and can exert micro-capillary forces onto the nanofingers. The micro-capillary forces can draw individual flexible nanofingers together and as the liquid evaporates allowing the flexible nanofingers to converge towards a central location of the group. The central location of convergence can be at least partially directed by Van der Waal forces between the metal or metal alloy coating the distal tip of the nanofingers and an analyte in the liquid.

Turning now to the liquid ejector. A liquid ejector can allow for precise deposition of a liquid, such as a liquid containing an analyte and/or a closing liquid. In one example, the liquid ejector can be a piezoelectric ejector, a thermal ejector, an electrostatic ejector, or an acoustic ejector. In one example, the ejector can be a thermal ejector. In yet another example, the ejector can be a piezoelectric ejector. The liquid ejector, regardless of type, can allow for controlled droplet size, improved droplet consistency, and the elimination of satellite droplets. As used herein, satellite droplets refer to a droplet or droplets of the liquid that scatter and land on an unattended area of the sensor.

Figure 4:
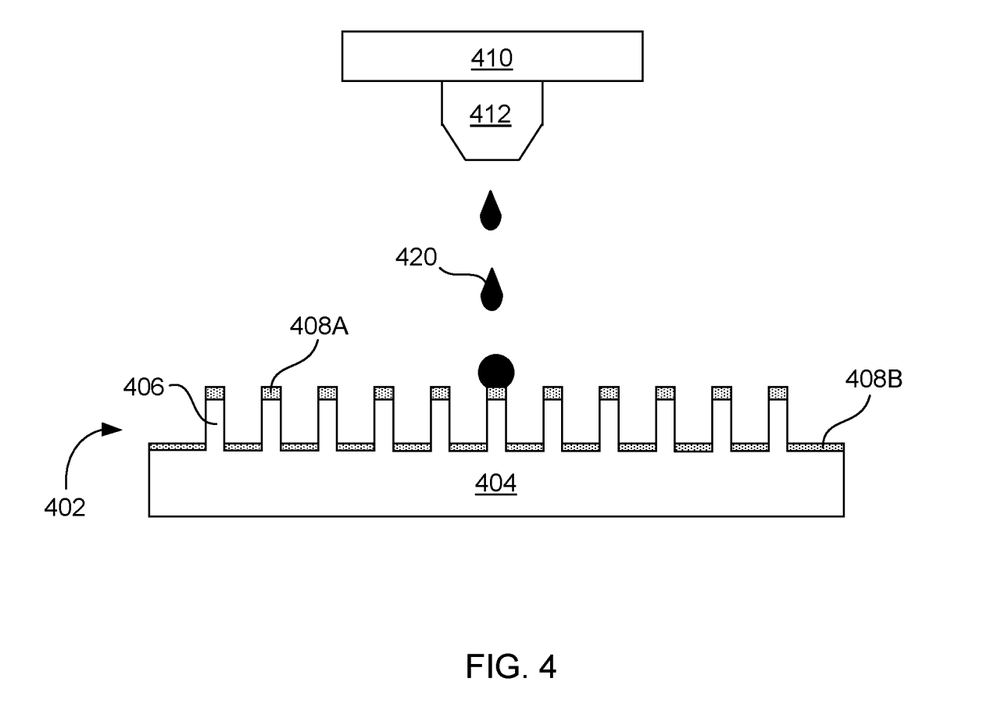
FIG. 4 schematically depicts an example of a luminescence-enhancement system dispensing a small droplet that sit on a distal tip of a nanofinger without reaching the substrate in accordance with examples herein.

As previously mentioned, the liquid ejector can allow for controlled droplet size. In one example, a jetting nozzle of the liquid ejector can allow ejection of a droplet of liquid that can have a volume of 2 pL to 10 µL. In other examples, the droplet of liquid can have a volume of from 25 pL to 5 µL, from 5 pL to 5 µL, from 15 pL to 1 µL, from 50 pL to 500 µL, from 10 pL to 1,000 pL, or from 20 pL to 500 pL. A droplet within this size range can in some examples be precisely deposited on the distal tip of the nanofinger and can allow for the concentration of an analyte in the liquid to be deposited at the distal tip. FIG. 4 schematically illustrates a liquid ejector 410 and jetting nozzle 412 that can be used to eject a droplet 420 of liquid onto a luminescence-enhancement sensor 402. The luminescence-enhancement sensor can include a substrate 404 with nanofingers 406 and a conductive metal or metal alloy coating the substrate 408B and the distal tip 408A of the nanofingers. In this example, the droplet can be deposited on just the tip of a single nanofinger, as shown, or can be applied to multiple adjacent tips (not shown). In certain examples, the surface tension of the liquid, the droplet size, the size of the nanofinger(s), the spacing between nanofingers, etc., can provide deposition events that are applied primarily at the distal tip and do not wet the substrate therebeneath.

Figure 5:
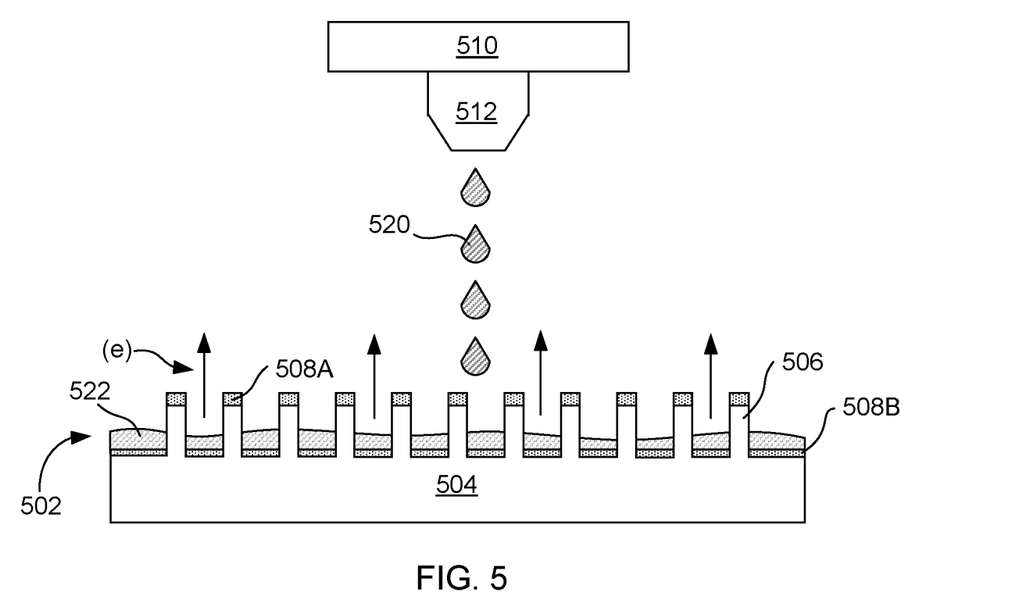
FIG. 5 schematically depicts an example of a luminescence-enhancement system illustrating an example of timed ejection of the droplets in accordance with examples herein.

In yet another example, the liquid ejector can be tunable to time ejection of the droplets on the nanofingers to coincide with a minimum evaporation of liquid from the droplet. For example, the ejection of droplets can be timed to match the evaporation rate of the liquid, so that a thin film of the liquid remains on the surface of the sensor. In one such example, the ejection could be timed so that a thin film of the liquid remains at or below a distal tip of the nanofingers. Maintaining the liquid at or below the distal tip of the nanofingers can apply micro-capillary forces throughout the entire dispensing period. FIG. 5 illustrates a liquid ejector 510 and jetting nozzle 512 used to eject droplets 520 onto a luminescence-enhancement sensor 502. The luminescence-enhancement sensor can include a substrate 504 with nanofingers 506 and a conductive metal or metal alloy coating the substrate 508B and the distal tip 508A of the nanofingers. The liquid 522 in this example can remain on the surface of the sensor but below a distal tip of the nanofingers. Evaporation, shown at (e), can occur removing liquid and then new liquid droplets can be applied at a rate that retains the level of the liquid below the distal tip metal coating.

Figure 6:
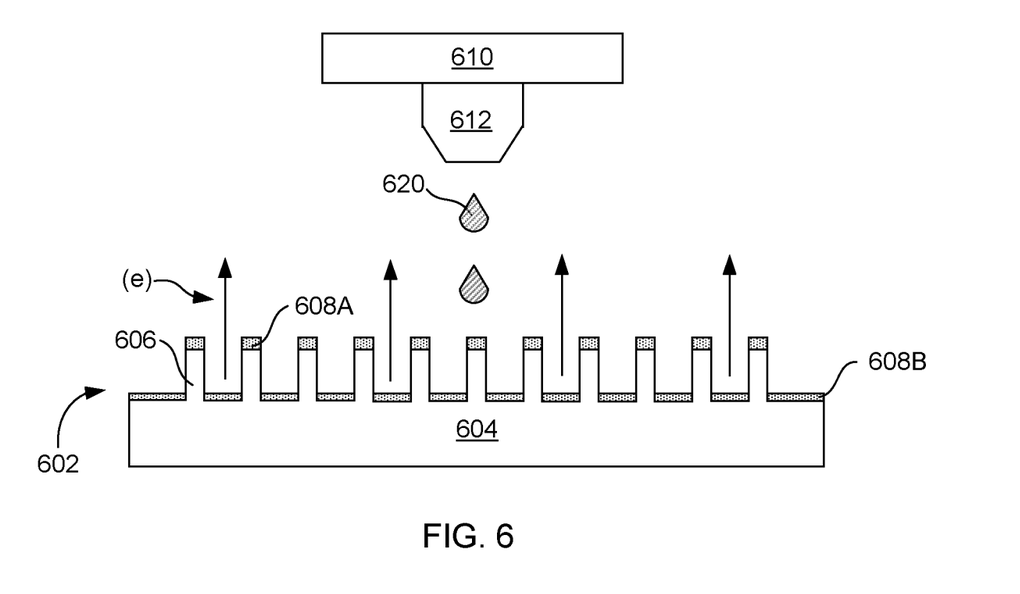
FIG. 6 schematically depicts an example of a luminescence-enhancement system illustrating an example of an alternative timed ejection of the droplets in accordance with examples herein.

In yet another example, the timing can be spaced to allow for essentially complete or complete evaporation (e) before a subsequent droplet is ejected, or before a subsequent droplet hits the sensor. One such example is schematically illustrated in FIG. 6. As shown in FIG. 6 a liquid ejector 610 and jetting nozzle 612 are used to eject droplets 620 onto a luminescence-enhancement sensor 602. The luminescence-enhancement sensor can include a substrate 604 with nanofingers 606 and a conductive metal or metal alloy coating a portion of the substrate 608B and the distal tip 608A of the nanofingers. As shown, the liquid can evaporate from the substrate before a subsequent droplet touches the substrate. This timing can result in a series of local drying events.

Figure 7:
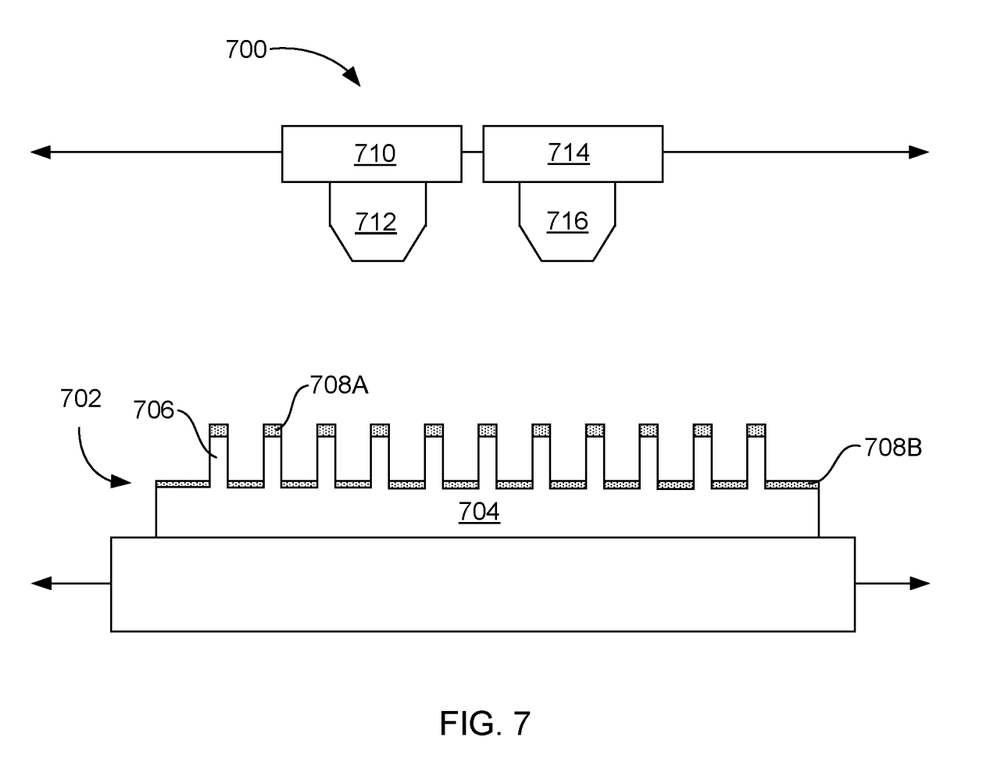
FIG. 7 schematically depicts an example of a luminescence-enhancement system in accordance with examples herein.

In some examples, the luminescence-enhancement system can further include a second liquid ejector with a second jetting nozzle. The second liquid ejector and the second jetting nozzle can be positionable relative to the luminescence-enhancement sensor to eject a second droplet of a second liquid on the group of nanofingers. As shown in FIG. 7 in one example, the luminescence-enhancement system 700 can include a liquid ejector 710 and jetting nozzle 712; a second liquid ejector 714 and second jetting nozzle 716; a luminescence-enhancement sensor 702 including a substrate 704, nanofingers 706, and metal or metal alloy coating on distal tips of the nanofingers 708A and the substrate 708B; and a movable stage 730. Notably, the movable stage can be relevant to other examples herein with only a single liquid ejector, or with other luminescence-enhancement sensors or systems. A dual liquid ejector system can be useful when the liquid containing the analyte will not result in a convergence of the nanofingers. For example, the liquid ejector and jetting nozzle can dispense a liquid that can deposit an analyte on the nanofingers. The second liquid ejector and second jetting nozzle can dispense droplets of a second liquid that can cause the nanofingers of the group contacted by the second liquid to converge but leave a gap between nanofingers at the distal tip due to contact or evaporation of the liquid from the droplet. The second liquid can be a closing liquid. As used herein, a "closing liquid" refers to a liquid that is operable to cause distal tips of nanofingers arranged in a group to converge due to contact or evaporation of the liquid. In some examples, the gap between distal tips of nanofingers can be less than 2 nm following closing.

In another example, the luminescence-enhancement system can include multiple liquid reservoirs that can share a single liquid ejector and jetting nozzle. Like before, this type of system can allow a liquid containing an analyte to be dispensed on the sensor and then can allow a closing liquid to be subsequently ejected onto the sensor. In yet other examples, the luminescence-enhancement system could include multiple liquid reservoirs in order to allow multiple liquids containing an analyte to be dispensed on different groups of nanofingers on the sensor.

In a further example, the luminescence-enhancement system can include a moveable stage for supporting the luminescence-enhancement sensor, as shown at 730 in FIG. 7. The movable stage can be used to move the location of the sensor in order to align a group of nanofingers with the jetting nozzle of the liquid ejector, a second jetting nozzle of a second liquid ejector, and/or an optical detection system. In one example, a moveable stage can be operable to allow for precise travel over a stage, e.g., 100 nm to 100 mm stage along one or two axes. This can allow the sensor to be previously moved in order to expose a different group of nanofingers on the sensor to the liquid ejector and jetting nozzle. In a further example, a moveable stage can be used for a larger move in order to transport a sensor from an area where it is aligned with a liquid ejector and jetting nozzle to a second area to align the sensor with an optical detector. The stage can be any stage that is capable of allowing precise travel.

Figure 8:
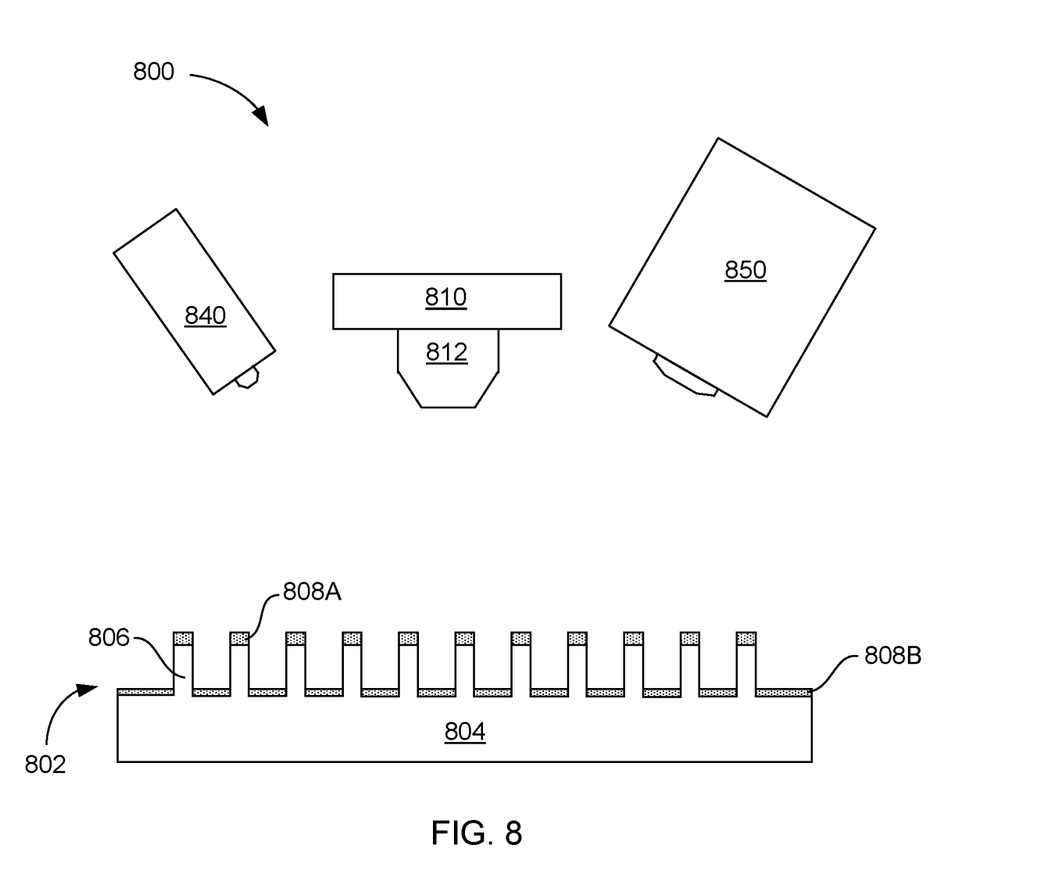
FIG. 8 schematically depicts an example of a luminescence-enhancement system in accordance with examples herein.

In yet another example, the luminescence-enhancement system can further include an optical detector that can be directable or directed toward the luminescence-enhancement sensor. As used herein an "optical detector" refers to a device for measuring a change in luminescence from a molecule which can be due to molecular vibrations. One example is illustrated in FIG. 8. As shown in FIG. 8 the luminescence-enhancement system 800 can include a liquid ejector 810 and jetting nozzle 812, a luminescence-enhancement sensor 802 including a substrate 804, nanofingers 806, and metal or metal alloy coating on distal tips of the nanofingers 808A and the substrate 808B. The system can also include an electromagnetic radiation source 840, such as a high energy laser, e.g., near UV, near IR, visible light that interacts with molecular vibrations, photons, or other excitations. An optical detector 850 can also be present to detect scattering, photon excitations, molecular resonance, etc. In some examples, the optical detector can further include a detector and an analyzer for detecting and analyzing emitted electromagnetic radiation. In one example, the luminescence-enhancement system can include the electromagnetic radiation source, luminescence-enhancement sensor, and the optical detector as part of a surface-enhanced Raman spectroscopy (SERS) device or a surface-enhanced fluorescence (SEF) device.

Figure 9:
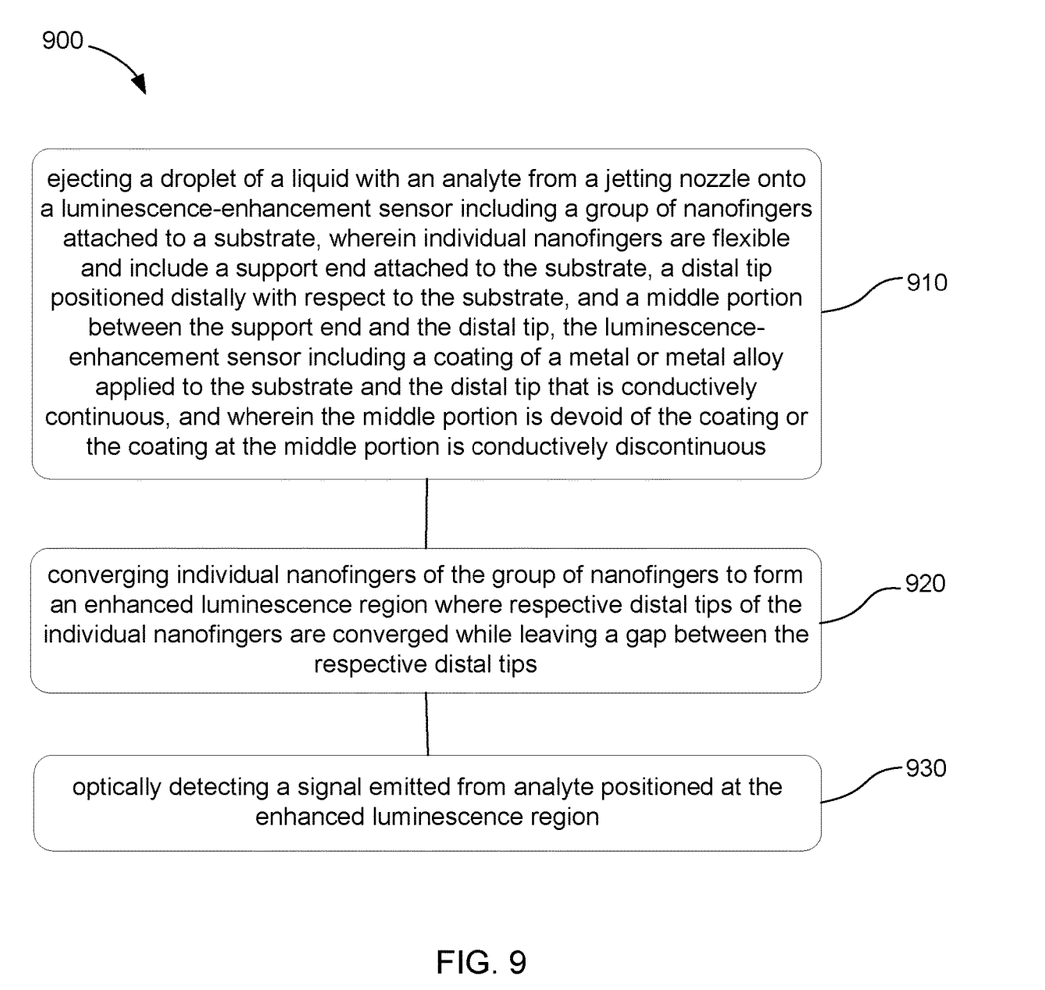
FIG. 9 schematically depicts an example of a method of sensing an analyte in accordance with examples herein.

In a further example as shown in FIG. 9, a method 900 of sensing an analyte can include ejecting 910 a droplet of a liquid with an analyte from a jetting nozzle onto a luminescence-enhancement sensor including a group of nanofingers attached to a substrate. Individual nanofingers can be flexible and include a support end attached to the substrate, a distal tip positioned distally with respect to the substrate, and a middle portion between the support end and the distal tip. The luminescence-enhancement sensor can include a coating of a metal or metal alloy applied to the substrate and the distal tip that is conductively continuous, and the middle portion can be devoid of the coating or the coating at the middle portion is conductively discontinuous. The method can also include converging 920 individual nanofingers of the group of nanofingers to form an enhanced luminescence region, or luminescence hot spot, where respective distal tips of the individual nanofingers can be converged while leaving a gap between the respective distal tips, and optically 930 detecting signal emitted from analyte positioned at the enhanced luminescence region.

As used herein, an "enhanced luminescence region," also sometimes referred to as a luminescence "hot spot," refers to an area of the sensor where enhanced luminescence occurs. In one example, enhanced luminescence can occur due to the convergence of the distal tips of a group of nanofingers. When analyte is located or trapped at these sites and the enhanced luminescence region is interrogated with an electromagnetic radiation source, analyte signal detected by an optical detector can be enhanced, e.g., enhanced amplification. Thus, enhanced luminescence can allow for more sensitive detection.

In one example, the analyte in the liquid may not result in the distal tip of the nanofingers within the group converging. For example, this can occur when the droplet of the liquid has a volume that rests on a distal tip of a nanofinger, as shown in FIG. 4, and does not penetrate a support end of a nanofinger. This can also occur in an example where a solute that contains an analyte does not result in capillary forces that are strong enough to cause distal tips of nanofingers to converge. This can occur in an example where the solute evaporates quickly. When convergence does not occur or does not occur to the desired extent, then in one example, converging can include ejecting a second droplet of a second liquid from a second jetting nozzle onto the group of nanofingers. As the second droplet of the second liquid penetrates the group of the nanofingers and evaporates capillary forces from penetration and evaporation, convergence can result. In another example, converging can occur due to capillary forces caused by droplet evaporation from contact with the group of nanofingers, and the analyte can be deposited from the liquid at the enhanced luminescence region. For example the droplet that is ejected can include the analyte and penetration and evaporation of the solute containing the analyte can result in convergence.

It is noted that, as used in this specification and the appended claims, the singular forms "a," "an," and "the" include plural referents unless the content clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range but also individual numerical values or sub-ranges encompassed within that range as if each numerical value and sub-range is explicitly recited. For example, a volume range of 25 pL to 75 µL should be interpreted to include not only the explicitly recited limits of 25 pL and 75 µL but also to include individual weights such as 50 pL, 100 pL, 25 µL, and sub-ranges therebetween such as from 40 pL to 15 µL, or from 100 pL to 1 µL, and etc.

What is claimed is:

1. A luminescence-enhancement system, comprising:
    a luminescence-enhancement sensor, including:
        a substrate,
        a group of nanofingers, wherein individual nanofingers are flexible and include a support end attached to the substrate, a distal tip positioned distally with respect to the substrate, and a middle portion between the support end and the distal tip, and
        a coating of a metal or metal alloy applied to the substrate and the distal tip that is conductively continuous, wherein the middle portion is devoid of the coating or the coating at the middle portion is conductively discontinuous; and
    a liquid ejector including a jetting nozzle to eject a liquid therefrom in the form of a droplet having a volume of 2 pL to 10 µL, wherein the liquid ejector is tunable to time ejection of the droplet onto the group of nanofingers in relation to an evaporation rate of the liquid in the form of the droplet on a substrate surface of the luminescence-enhancement sensor, wherein the liquid ejector is tunable (i) to retain a level of liquid below the metal or the metal alloy coating at the distal tip of the nanofingers or (ii) so that the liquid on the substrate surface evaporates before a subsequent droplet is ejected from the liquid ejector, and wherein the group of nanofingers and the jetting nozzle are positionable relative to one another for the droplet to be deposited on the group of nanofingers.

2. The luminescence-enhancement system of claim 1, wherein individual nanofingers within the group of nanofingers are spaced at the support end at from 20 nm to 500 nm, have an average length from 0.05 µm to 2 µm, and have an average width at the support end from 50 nm to 500 nm.

3. The luminescence-enhancement system of claim 1, wherein the liquid ejector further comprises the liquid loaded therein.

4. The luminescence-enhancement system of claim 3, wherein the liquid and the flexible nanofingers are paired wherein the droplet ejected by the liquid ejector onto the group of nanofingers generates forces to cause adjacent individual nanofingers of the group of nanofingers converge at their respective distal tips but still leave a gap between adjacent distal tips.

5. The luminescence-enhancement system of claim 3, wherein the liquid has a surface tension and is electable from the liquid ejector at a droplet volume relative to spacing between individual nanofingers of the group of nanofingers such that individual nanofingers of the group of nanofingers are contacted by the droplet at their respective distal tips without wetting the support end thereof.

6. The luminescence-enhancement system of claim 1, wherein the liquid ejector is tunable to time ejection of the droplets onto the group of nanofingers relative to a minimum evaporation rate of liquid from the droplet of liquid.

7. The luminescence-enhancement system of claim 1, further comprising a second liquid ejector including a second jetting nozzle to eject a second liquid therefrom in the form of a second droplet having a volume of 2 pL, to 10 µL.

8. The luminescence-enhancement system of claim 7, wherein the liquid ejector includes the liquid loaded therein, and wherein the second liquid ejector further includes the second liquid loaded therein, the liquid including an analyte to be loaded on the group of nanofingers via the droplet, and the second liquid to cause adjacent individual nanofingers of the group of nanofingers to converge at their respective distal tips but still leaving a gap between adjacent distal tips.

9. The luminescence-enhancement system of claim 1, further comprising a movable stage supporting the luminescence-enhancement sensor to align the group of nanofingers with the jetting nozzle, an optical detector, or a combination thereof.

10. The luminescence-enhancement system of claim 1, further comprising a plurality of periodically spaced groups of nanofingers with adjacent groups of nanofingers spaced at from 0.5 µm to 5 µm.

11. The system of claim 10, wherein the luminescence-enhancement system is a surface-enhanced Raman spectroscopy (SERS) system or a surface-enhanced fluorescence (SEF) system.

12. The luminescence-enhancement system of claim 1, wherein the liquid ejector is tunable to time ejection of the droplets onto the group of nanofingers that retains a level of the liquid below the metal or the metal alloy coating at the distal tip of the nanofingers.

13. The luminescence-enhancement system of claim 1, wherein the liquid ejector is tunable to time ejection of the droplets onto the group of nanofingers such that the liquid on the substrate surface evaporates before a subsequent droplet is ejected from the liquid ejector.

14. A luminescence-enhancement system, comprising:
a luminescence-enhancement sensor, including:
   a substrate,
   a group of nanofingers, wherein individual nanofingers are flexible and include a support end attached to the substrate, a distal tip positioned distally with respect to the substrate, and a middle portion between the support end and the distal tip, and
   a coating of a metal or metal alloy applied to the substrate and the distal tip that is conductively continuous, wherein the middle portion is devoid of the coating or the coating at the middle portion is conductively discontinuous;

a liquid ejector including a jetting nozzle to eject a liquid therefrom in the form of a droplet having a volume of 2 pL to 10 µL onto the group of nanofingers, wherein the liquid ejector is tunable to time ejection of the droplet onto the group of nanofingers in relation to an evaporation rate of the liquid in the form of the droplet on a substrate surface of the luminescence-enhancement sensor, wherein the liquid ejector is tunable (i) to retain a level of liquid below the metal or the metal alloy coating at the distal tip of the nanofingers or (ii) so that the liquid on the substrate surface evaporates before a subsequent droplet is ejected from the liquid ejector, and wherein the group of nanofingers and the jetting nozzle are positionable relative to one another for the droplet to be deposited on the group of nanofingers;

an electromagnetic radiation source to emit electromagnetic radiation toward the group of nanofingers, and an optical detector to detected luminescence emitted from an enhanced luminescence region generated by application of the droplet on the group of nanofingers, wherein the luminescence emitted is in response to interaction with the electromagnetic radiation.

15. A method of sensing an analyte, comprising:
repeatedly ejecting a droplet of a liquid with an analyte having a volume of 2 pL to 10 µL onto a luminescence-enhancement sensor including a group of nanofingers attached to a substrate at a time period coinciding with an evaporation rate of the liquid from a jetting nozzle, wherein individual nanofingers are flexible and include a support end attached to the substrate, a distal tip positioned distally with respect to the substrate, and a middle portion between the support end and the distal tip, the luminescence-enhancement sensor including a coating of a metal or metal alloy applied to the substrate and the distal tip that is conductively continuous, and wherein the middle portion is devoid of the coating or the coating at the middle portion is conductively discontinuous, wherein the liquid ejector is tunable (i) to retain a level of liquid below the metal or the metal alloy coating at the distal tip of the nanofingers or (ii) so that the liquid on the substrate surface evaporates before a subsequent droplet is ejected from the liquid ejector, and wherein the group of nanofingers and the jetting nozzle are positionable relative to one another for the droplet to be deposited on the group of nanofingers;

converging individual nanofingers of the group of nanofingers to form an enhanced luminescence region where respective distal tips of the individual nanofingers are converged while leaving a gap between the respective distal tips; and optically detecting a signal emitted from analyte positioned at the enhanced luminescence region.

16. The method of claim 15, wherein converging includes ejecting a second droplet of a second liquid from a second jetting nozzle onto the group of nanofingers at a time period coinciding with a second evaporation rate of the second liquid.

17. The method of claim 15, wherein converging occurs due to capillary forces caused by droplet evaporation from contact with the group of nanofingers and wherein, analyte is deposited from the liquid at the enhanced luminescence region.

* * * * *